United States Patent
Bussan et al.

(10) Patent No.: US 7,526,662 B2
(45) Date of Patent: Apr. 28, 2009

(54) METHOD AND APPARATUS FOR SECURE MODULE RESTORATION

(75) Inventors: Christopher F. Bussan, Crystal Lake, IL (US); Joseph M. Hansen, Williams Bay, WI (US)

(73) Assignee: Motorola, Inc., Schaumburg, IL (US)

( * ) Notice: Subject to any disclaimer, the term of this patent is extended or adjusted under 35 U.S.C. 154(b) by 502 days.

(21) Appl. No.: 11/218,799

(22) Filed: Sep. 2, 2005

(65) Prior Publication Data

US 2007/0055897 A1    Mar. 8, 2007

(51) Int. Cl.
G06F 1/00 (2006.01)
G06F 1/26 (2006.01)
G06F 1/32 (2006.01)

(52) U.S. Cl. .................. 713/320; 713/300; 713/324

(58) Field of Classification Search .......... 713/320, 713/300, 324
See application file for complete search history.

(56) References Cited

U.S. PATENT DOCUMENTS 7,137,003 B2 * 11/2006 Krishnan et al. .......... 713/172

2003/0120937 A1 * 6/2003 Hillis et al. .............. 713/189
2003/0209607 A1   11/2003 Kisliakov

FOREIGN PATENT DOCUMENTS

EP  1065626 A1  1/2001
WO  02069655 A2  9/2002

OTHER PUBLICATIONS

International Search Report PCT/US2006/029783 dtd Feb. 16, 2007.

* cited by examiner

*Primary Examiner*—Thomas Lee
*Assistant Examiner*—Michael J Brown
(74) *Attorney, Agent, or Firm*—Ingrassia, Fisher & Lorenz, P.C.

(57) ABSTRACT

A method and apparatus is provided for power conservation of a hardware module (142) which is coupleable to a portable electronic device (100). The hardware module (142) has unique identification information associated therewith and stored therein. The unique identification information is provided periodically (308) to the portable electronic device (100) and stored therein (207). To conserve power, the portable electronic device (100) sends a power-down notice (212) to the hardware module (142), the module controller (144) stores current state information of the hardware module (142) in a non-volatile memory (146) thereof, and the hardware module (142) is powered off (214).

15 Claims, 9 Drawing Sheets

METHOD AND APPARATUS FOR SECURE MODULE RESTORATION

FIELD OF THE INVENTION

The present invention generally relates to portable electronic devices, and more particularly relates to a method and apparatus for restoration of power to a secure module of a portable electronic device.

BACKGROUND OF THE INVENTION

Many portable electronic devices, such as cellular phones, commonly have a detachable smartcard module, commonly called a Universal Identity Module (UIM) or a Subscriber Identity Module (SIM). The module stores identification information unique to a user of the portable electronic device and may be transferred from one device to another, such as from one cellular phone to another. The portable electronic devices utilize a number of power conservation techniques to improve battery life. The module, of course, also consumes power. To reduce the current drain of the hardware module to the minimum level, the supply of power to the module must be removed. But if the module contains any internal state information, the state will be lost when the module is powered-off. It may not be easy or possible for the device to re-initialize the module since the module state may not be known to the device. In fact, it may be required that the portable electronic device not know the internal state of the module. For example, the SIM toolkit internal to a UIM maintains state information and, for security reasons, the SIM toolkit state must not be known to the rest of a cellular phone. While it is desirable to power-off the UIM for periods of time when it is not needed, thereby allowing the rest of the phone to run, the UIM cannot be powered-off since the SIM toolkit state internal to the card would be lost.

Thus, what is needed is a method and apparatus for permitting power conservation by shutting off power to a hardware module without losing the state information of the module. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

A method and apparatus is provided for permitting restoration of power to a secure module of a portable electronic device. A method for power conservation in a portable electronic device coupleable to a hardware module, where the hardware module has unique identification information associated therewith, includes the steps of receiving the unique identification information from the hardware module and storing it. After sending a power-down notice to the hardware module, the module is powered off. The step of powering off the hardware module may include the steps of receiving encrypted state information from the hardware module and storing it or receiving and storing a codeword before powering off the module. To later power up the hardware module, the unique identification information is provided to the portable electronic device and, if equivalent to the previously stored information, the module is powered up with either stored state information in the module or, after decrypting, the encrypted state information received by the module.

A portable electronic device in accordance with the present invention comprises a power source, power control circuitry coupled to the power source for controlling the supply of power, a controller coupled to the power control circuitry for providing power conservation signals thereto, a memory, a hardware module comprising a module controller and a non-volatile memory coupled to the module controller, and a module connector for physically coupling the hardware module to the portable electronic device and for electrically coupling the power control circuitry and the controller to the module controller. The controller, after receiving first unique identification information from the module controller for storage in the memory, sends a module power-down notice signal to the module controller and, thereafter, sends a first power conservation signal to the power control circuitry for powering-down the hardware module. The module controller stores state information of a present state of the hardware module in the non-volatile memory in response to receiving the module power-down notice signal. The controller, after sending the first power conservation signal, sends a second power conservation signal to the power control circuitry for powering-on the hardware module, and thereafter receives second unique identification information from the hardware controller, retrieves the first unique identification information from the memory, and, if the first unique identification information is equivalent to the second unique identification information, sends a re-initialize signal to the hardware controller. The hardware controller re-initializes the hardware module with the state information stored in the non-volatile memory in response to receiving the re-initialize signal.

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
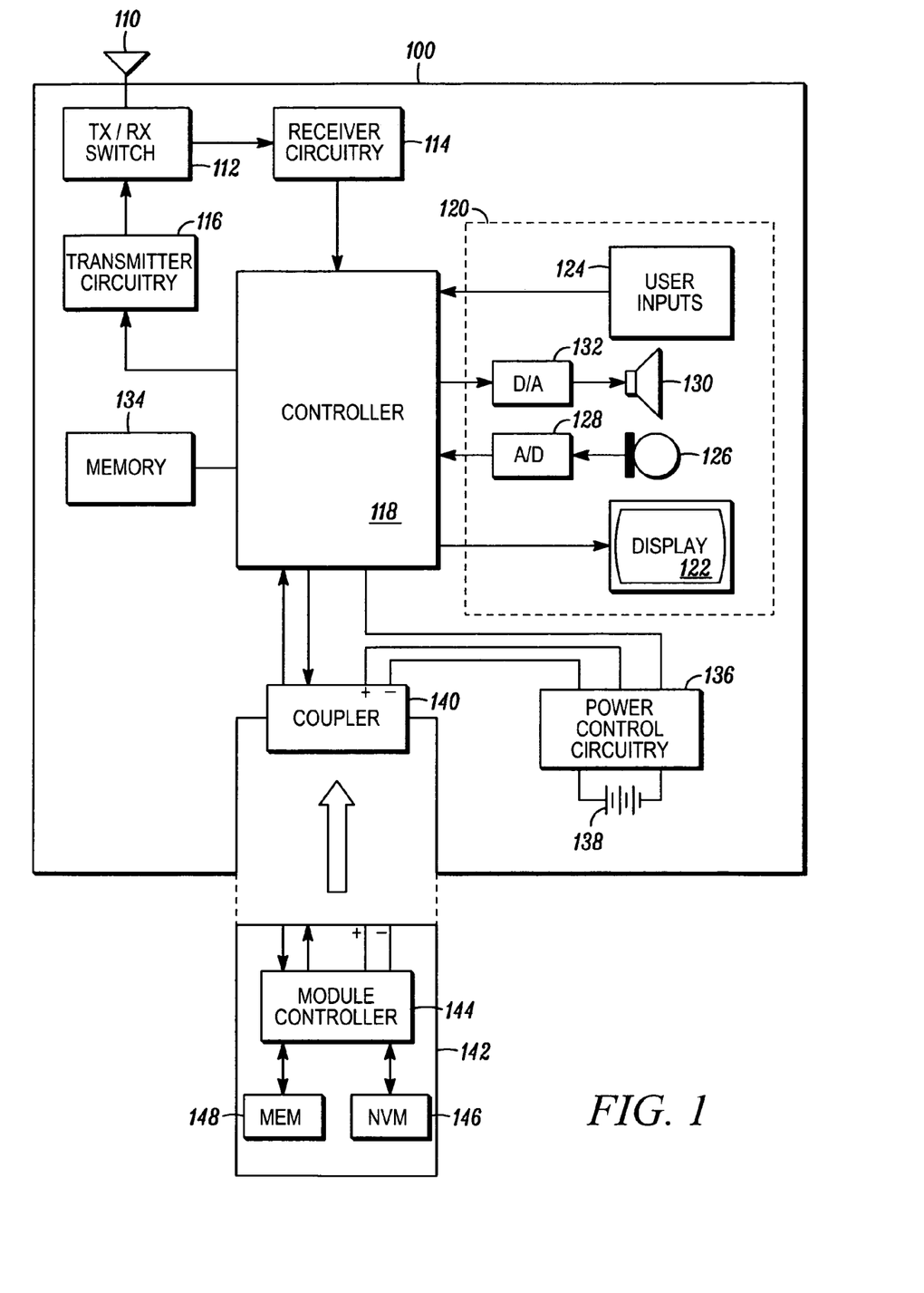
FIG. 1 is a block diagram of a portable communication device and a hardware module in accordance with the present invention.

Referring to FIG. 1, a portable electronic device 100 in accordance with the present invention is shown. Although the portable electronic device 100 is depicted as a cellular telephone, the portable electronic device 100 can be implemented as a pager, a portable digital assistant (PDA), a laptop computer or the like. The portable electronic device 100 includes an antenna 110 for receiving and transmitting radio frequency (RF) signals. A receive/transmit switch 112 selectively couples the antenna 110 to receiver circuitry 114 and transmitter circuitry 116 in a manner familiar to those skilled in the art. The receiver circuitry 114 demodulates and decodes the RF signals to derive information and is coupled to a controller 118 for providing the decoded information thereto for utilization thereby in accordance with the function(s) of the portable electronic device 100. The controller 118 also provides information to the transmitter circuitry 116 for encoding and modulating information into RF signals for transmission from the antenna 110.

The controller 118 is coupled to user interface circuitry 120 including, for example, a display 122 for presenting video output to a user, user controls 124, such as a keypad, for receiving user input thereon, a microphone 126 for receiving voice input which is converted to digital signals by an analog-to-digital (A/D) converter 128, and a speaker 130 for providing audio output to the user after passing signals through a digital-to-analog (D/A) converter 132.

The controller 118 is further coupled to a memory device 134 for storing information therein and for retrieving and utilizing information therefrom. Additionally, the controller 118 is coupled to power control circuitry 136 for controlling the provision of power from a power source 138 to the components of the portable electronic device 100. For example, to perform power conservation routines, the controller 118 can provide power conservation signals to the power control circuitry to power-down or power-on different components.

In accordance with the present invention, the portable electronic device includes a module connector 140 for physically and electrically coupling a hardware module such as a universal identity module (UIM) 142 to the portable electronic device 100. The UIM 142 includes a module controller 144 coupled to a non-volatile memory 146 and a volatile memory 148. The module controller 144 is electronically coupled to the power control circuitry 136 and the controller 118 through the module connector 140. The UIM 142 has unique identification information associated therewith to specifically identify the UIM 142 and typically contains secure state information which specifies which operations the portable communication device is permitted to perform. For example, e-commerce capability could be stored in the memory 146, 148, such as what bills could be paid or what bank accounts or credit cards could be used for payment. The authorization for these operations could be pre-programmed into the UIM 142 or, in a portable communication device 100, could be programmed by the network over the air. The user of the portable electronic device 100 is typically incapable of reprogramming operational information or state information in the UIM 142, however some hardware modules 142 may allow the user to store user information (not state information) in the memory 146.

Figure 2:
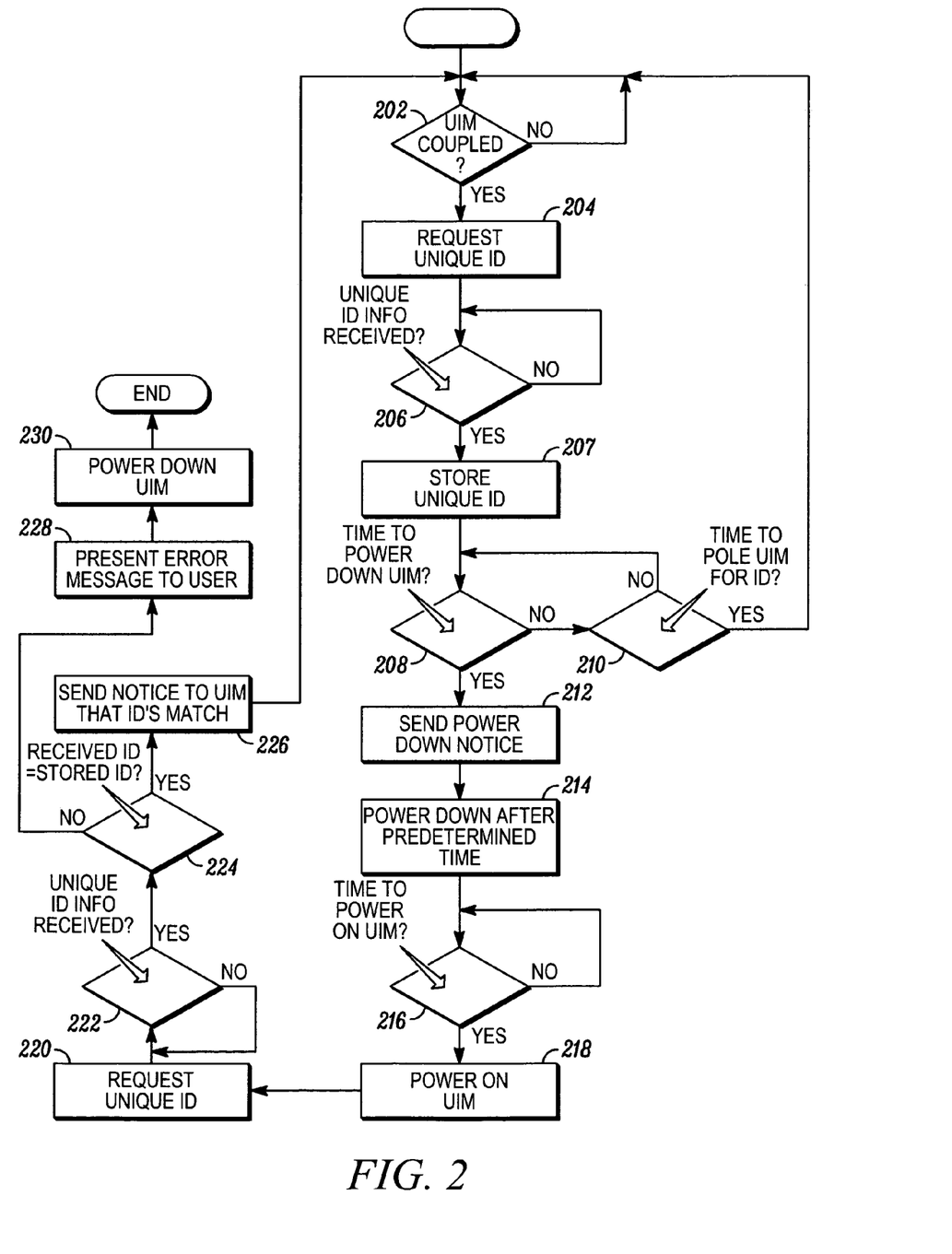
FIG. 2 is a flowchart of a power conservation scheme of the controller of the portable communication device of FIG. 1 in accordance with a first embodiment of the present invention.

Referring to FIG. 2, operation of the controller 118 of the portable electronic device 100 in accordance with a first embodiment of the present invention is described. Processing in accordance with the present invention first determines 202 whether a UIM 142 is attached to the portable electronic device 100. If the UIM 142 is coupled thereto 202, the controller 118 periodically poles the UIM module controller 144 for unique identification information associated therewith, such as a UIM ID, by first requesting the unique identification information 204 and then determining if the unique identification information has been received 206. When the information is received 206, the controller 118 stores 207 the unique identification information in the memory 134.

A smartcard, such as the UIM 142, consumes power and typical power conservation methods do not eliminate the UIM 142 power consumption (including leakage current when power is provided to the UIM 142) because UIM 142 state information is lost when power is removed. In accordance with the present invention, the UIM 142 may be power cycled for power conservation without losing state information and without compromising the security of the state information. When the unique information has been received 206, the controller 118 determines whether it is time to power down the UIM 142 for power conservation 208 or whether it is time to pole the UIM 142 again for its unique identification information 210.

When it is time to again pole 210 the UIM 142, the controller 118 requests the unique identification information 204 and awaits reception of the identification information 206, thereafter storing the information 207 in the memory 134. When it is time to power down the UIM 208, the controller 118 sends a power-down notice 212 to the UIM 142. The request may be provided by a message or the setting of a control line. After a predetermined time (sufficient for the UIM 142 to store the current state information in the non-volatile memory 146 as described below) has passed, the controller 118 signals the power control circuitry 136 to power off 214 the UIM 142.

In accordance with the power conservation method managed by the controller 118, processing determine whether it is time to power on 216 the UIM 142. When it is time 216, the controller 118 signals the power control circuitry 136 to power on 218 the UIM 142. The controller 118 then requests the unique identification information 220 from the module controller 144. Alternatively, the module controller 144 could be programmed to automatically send the unique identification information when the UIM 142 is powered on 218. Either way, the controller 118 awaits reception of the unique identification information 222 and, when received 222, retrieves the stored unique identification information 223 and compares it to the received unique identification information to determine whether the received unique identification information is equivalent to the retrieved unique identification information 224.

If the received unique identification information is equivalent to the stored unique identification information 224, the controller 118 instructs the module controller 144 to re-initialize 226 and processing returns for periodical poling for the unique identification information 204. If there is not a match 224, the controller 118 signals the user interface circuitry 120 to present an error message to the user 228 and then signals the power control circuitry to power down 230 the UIM 142. When the user has corrected the problem, the process described hereinabove will restart.

Figure 3:
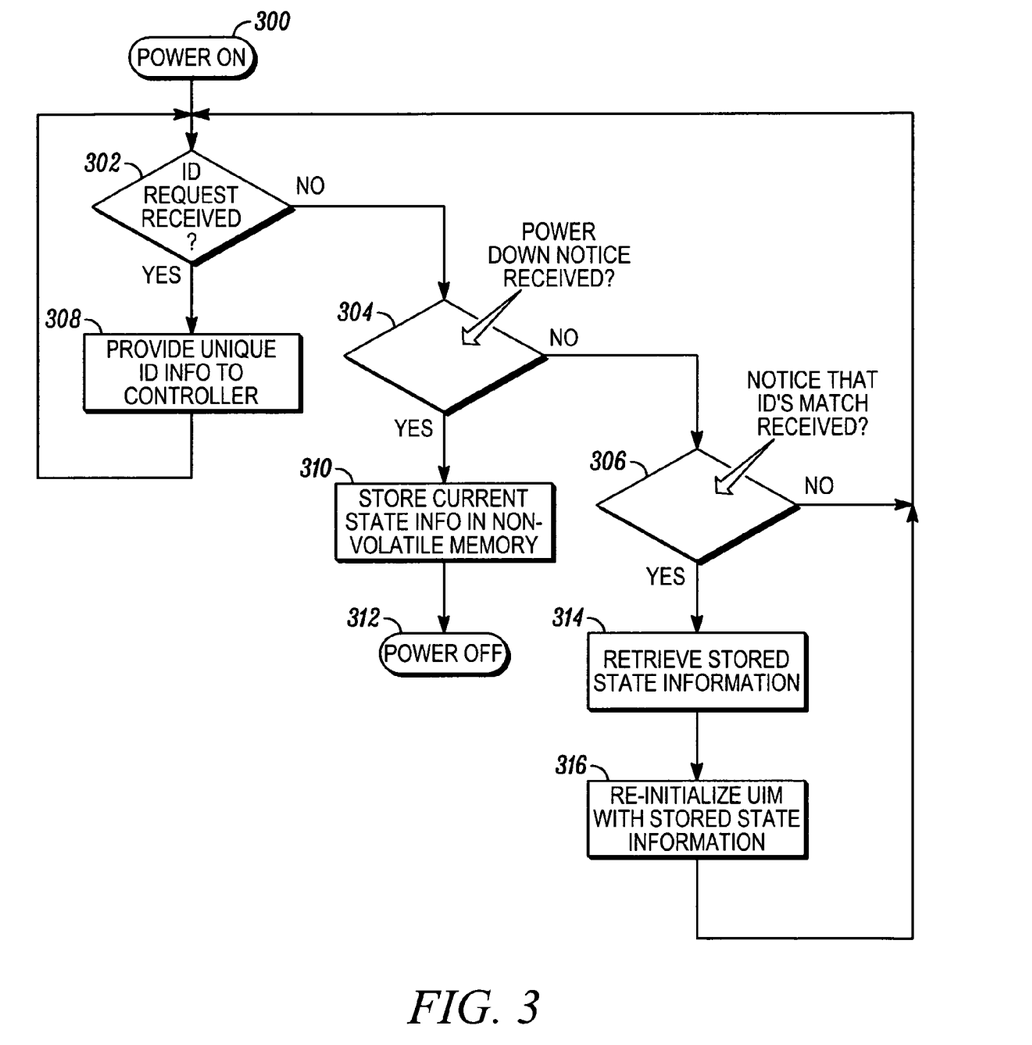
FIG. 3 is a flowchart of a power conservation scheme of the module controller of the hardware module of FIG. 1 in accordance with the first embodiment of the present invention.

Referring to FIG. 3, operation of the module controller 144 in accordance with the first embodiment of the present invention will be described. When the UIM 142 is powered on 300, the module controller 144 awaits reception of a request from the controller 118 for the unique identification information thereof 302, reception of a notice from the controller 118 that the UIM 142 will be powered down 304, or notification from the controller 118 that the unique identification information provided thereto matches stored unique identification information 306.

When a request from the controller 118 for the unique identification information is received 302, the module controller 144 provides the unique identification information 308 to the controller 118. Processing then returns to await detection of the next event 302, 304, 306. When a notice is received from the controller 118 that the UIM 142 will be powered down 304, the module controller 144 stores the current state information 310 in the non-volatile memory 146 such that the state information will be retained while the UIM is powered-off. The UIM 142 may encrypt the state information for security reasons before storing it to the memory 146. The module controller 144 may then indicate to the controller 118 that it may be powered-down or the UIM 142 is automatically powered down after a pre-determined time 312.

When the controller 118 notifies the module controller 144 that the unique identification information provided to the controller 118 matches stored unique identification information 306, the module controller 144 retrieves the stored state information (i.e., the re-initialization information) 314 from the memory 146 and re-initializes the UIM 142 with the stored state information 316. In this manner, when the UIM 142 is powered back on, the module controller 144 restores the state of the UIM 142 from the re-initialization information it stored in the memory 146, decrypting the data if necessary. As the state information was stored in the non-volatile memory 146 of the UIM 142, current drain savings are provided by allowing the UIM 142 to be powered-off for periods of time when it is not being accessed, while keeping the internal state of the UIM 142 secure. Current UIM specification standards may need to be changed to allow implementation of the present invention.

Figures 4, 4A:
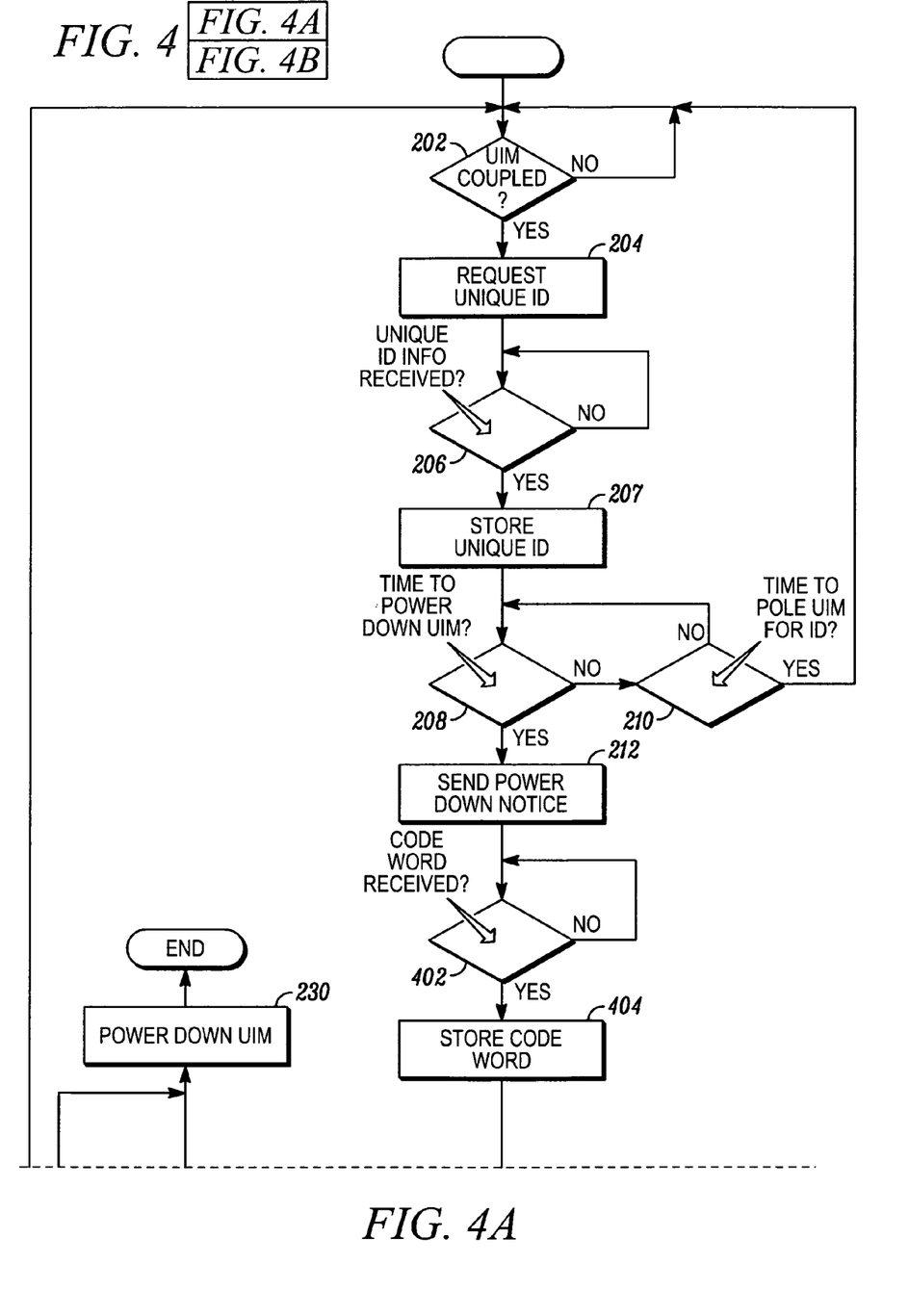
FIG. 4, consisting of FIGS. 4A and 4B, is a flowchart of a power conservation scheme of the controller of the portable communication device of FIG. 1 in accordance with a second embodiment of the present invention.
Figure 4B:
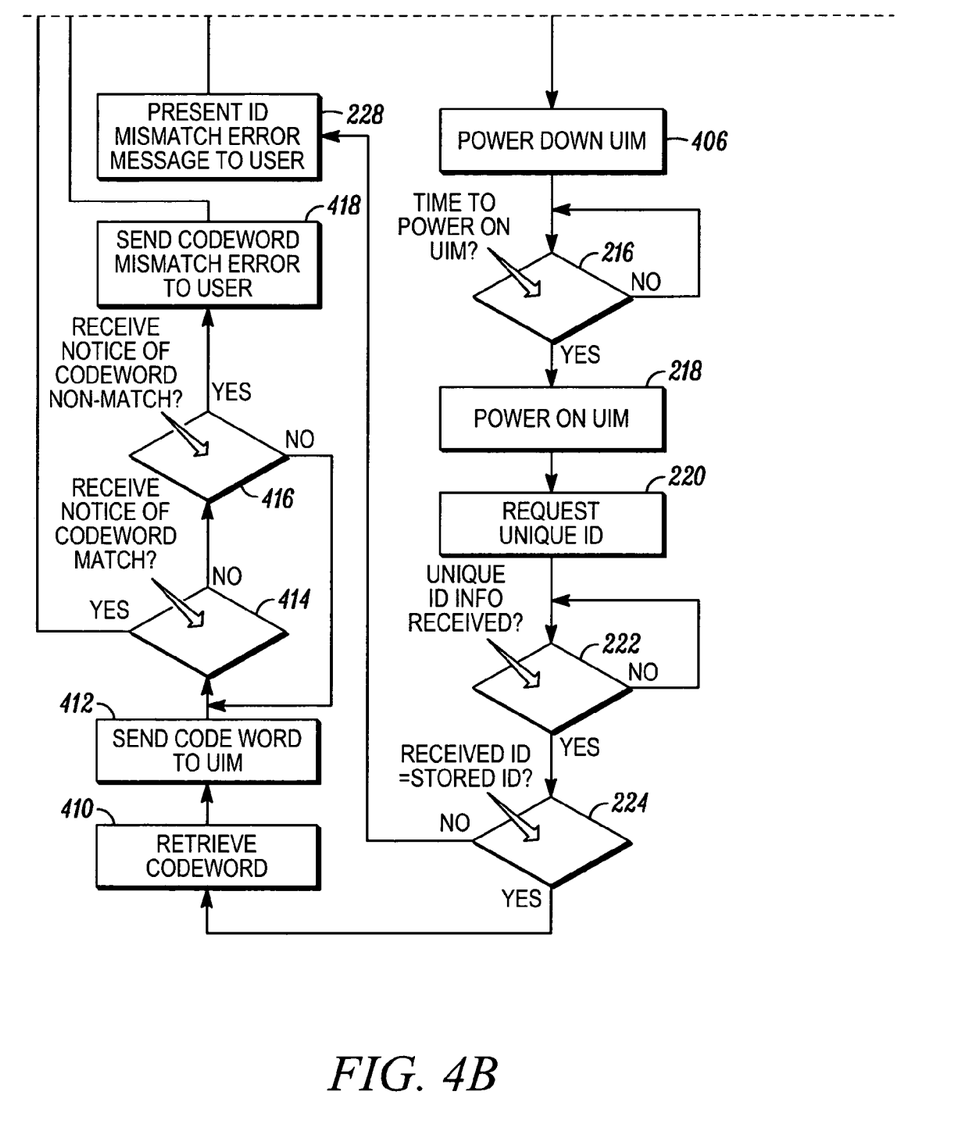

A second embodiment of the present invention is described with reference to the flowcharts of FIGS. 4 and 5 wherein numbers common to FIGS. 2 and 3 represent identical steps. Referring to FIGS. 4A and 4B, the operation of the controller 118 differs from the operation in accordance with FIG. 2 in that instead of powering down the UIM 142 after a predetermined time 214, the controller 118 awaits reception from the module controller 144 of a codeword 402 and, in response to reception of that codeword 402, stores the codeword 404 in the memory 134 and, then, powers down 406 the UIM 142. In addition, instead of instructing the module controller 144 to re-initialize 226 the UIM 142, the controller 118 retrieves the codeword 410 from the memory 134 and sends the codeword 412 to the module controller 144. Processing then awaits reception of a notice from the controller 144 that either the codeword sent matches the UIM 142 codeword 414 or does not match the UIM 142 codeword 416. If the codewords match 414, processing returns to pole the module controller 144 for the unique identification information 204. If the codewords do not match 416, the controller 118 signals the user interface circuitry 120 to present an appropriate error message to the user 418 and the UIM 142 is powered down 230.

Figure 5:
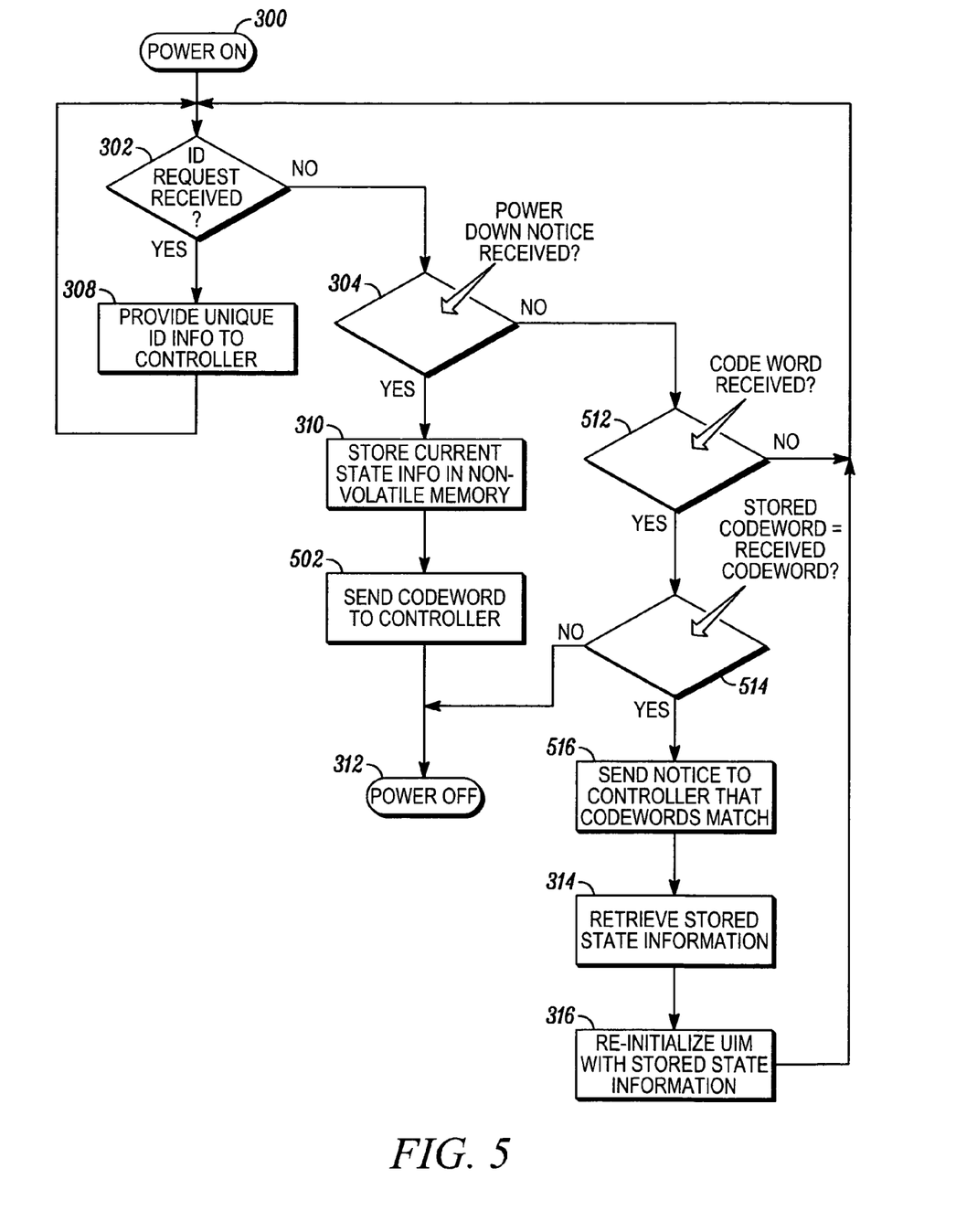
FIG. 5 is a flowchart of a power conservation scheme of the module controller of the hardware module of FIG. 1 in accordance with the second embodiment of the present invention.

Referring to FIG. 5, in accordance with the second embodiment of the present invention, after storing the state information 310 in the memory 146, the module controller 144 sends the codeword 502 to the controller 118 and the UIM 142 is powered down 312. In addition, instead of the step of awaiting instructions from the controller 118 to re-initialize 306 (FIG. 3), processing awaits reception of the codeword 512. When the codeword is received 512, the module controller 144 compares 514 the codeword received to the codeword stored in the UIM 142 and, when there is a match 514, the module controller 144 retrieves the stored state information 314 and re-initializes 316 the UIM 142. When there is not a match between the received codeword and the stored codeword 514, an error message is sent 516 to the controller 118 for action thereupon, and the UIM 142 is powered down 312.

Figure 6A:
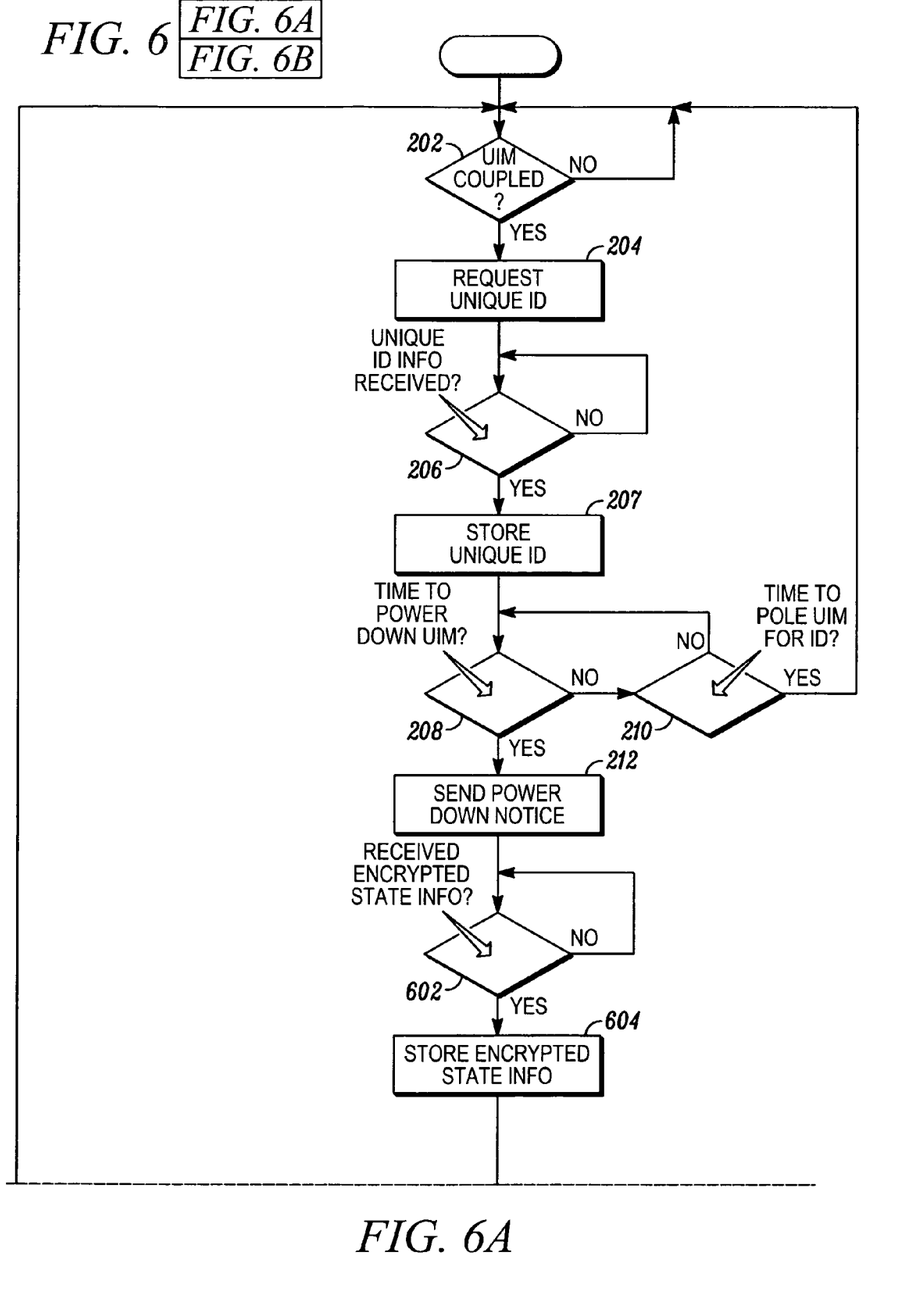
FIG. 6, consisting of FIGS. 6A and 6B, is a flowchart of a power conservation scheme of the controller of the portable communication device of FIG. 1 in accordance with a third embodiment of the present invention.
Figure 6B:
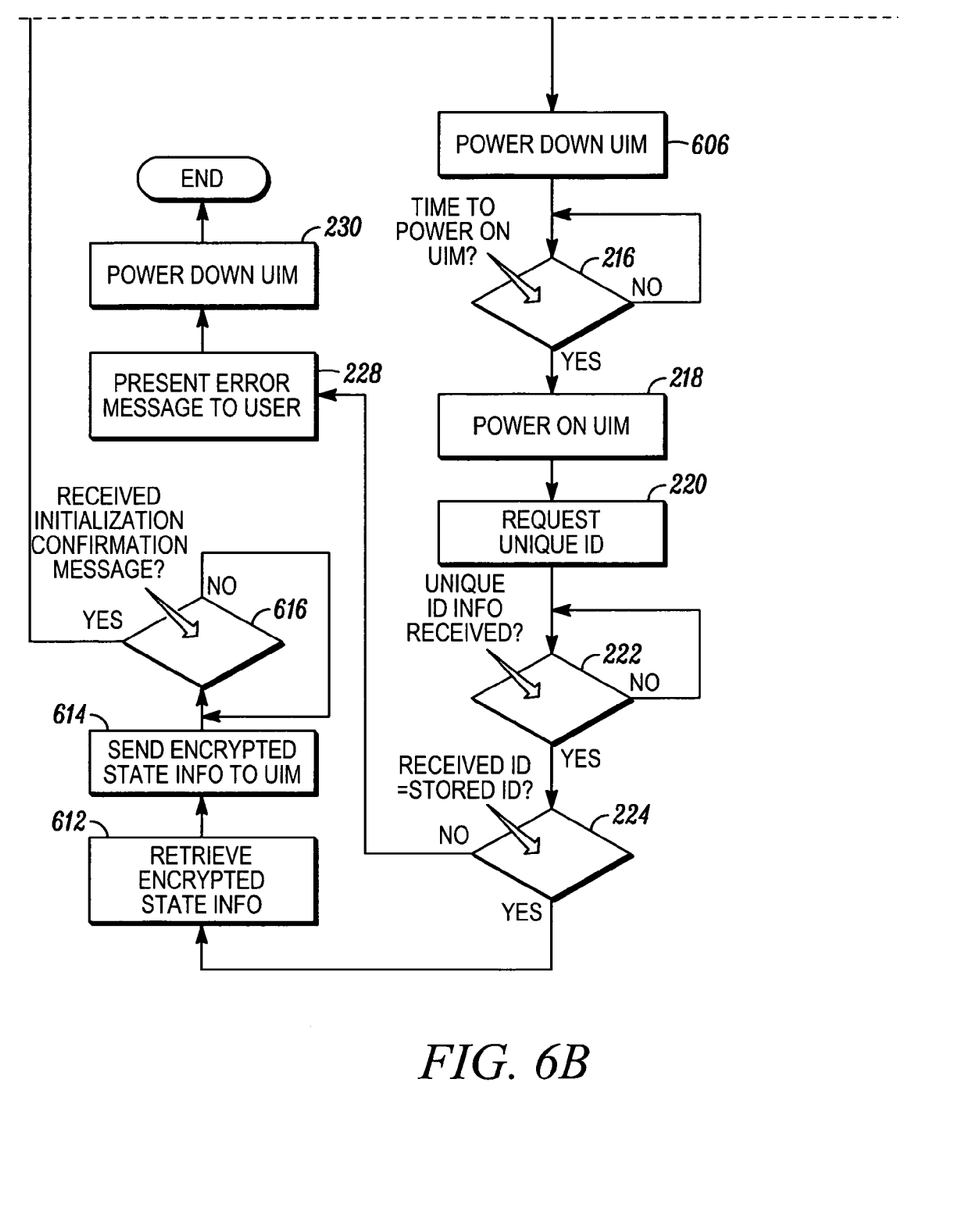

A third embodiment of the present invention is described with reference to the flowcharts of FIGS. 6 and 7. Referring to FIGS. 6A and 6B, the operation of the controller 118 differs from the operation in accordance with FIG. 2 in that instead of powering down the UIM 142 after a predetermined time 214, the controller 118 awaits reception from the module controller 144 of a re-initialization packet 602 comprising encrypted UIM 142 state information. In response to reception of the encrypted state information 602, the controller 118 stores the re-initialization packet 604 in the memory 134 and, then, powers down 606 the UIM 142.

In addition, instead of instructing the module controller 144 to re-initialize 226 the UIM 142, the controller 118 retrieves 612 the encrypted re-initialization packet from the memory 134 and sends the information 614 to the module controller 144. Processing then awaits reception of a re-initialization confirmation message 616 from the controller 144. When the re-initialization confirmation message is received 616, processing returns to pole the module controller 144 for the unique identification information 204. While not shown in FIG. 6, a timer could be set and if the re-initialization confirmation message is not received 616 within a predetermined time, an error message could be presented to the user.

Figure 7:
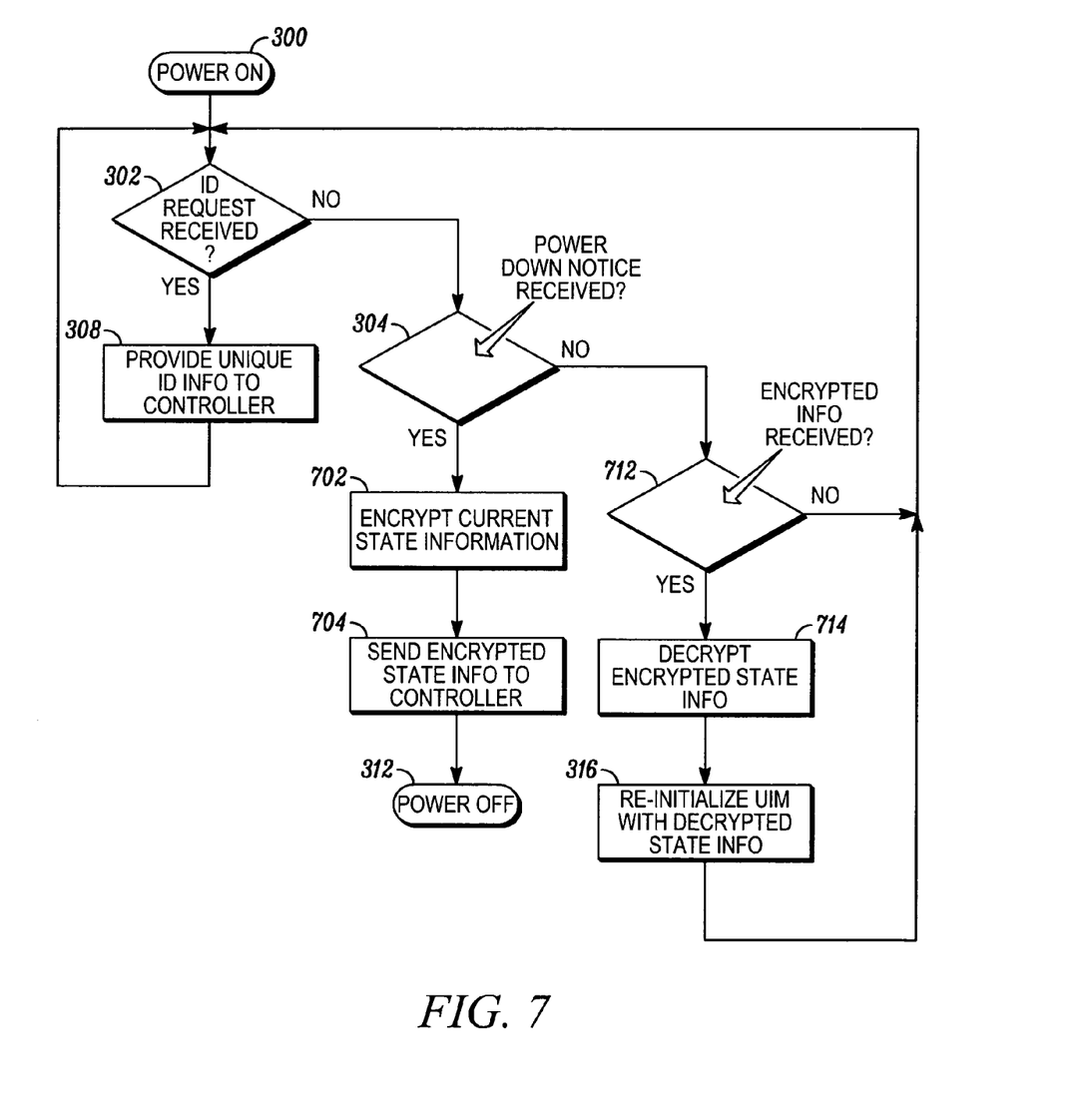
FIG. 7 is a flowchart of a power conservation scheme of the module controller of the hardware module of FIG. 1 in accordance with the third embodiment of the present invention.

Referring to FIG. 7, in accordance with the third embodiment of the present invention, instead of storing the state information 310 in the memory 146, the module controller 144 encrypts the current UIM 142 state information as re-initialization packet data 702 and sends the encrypted re-initialization information 704 to the controller 118. The UIM 142 is then powered down 312. In addition, instead of the step of awaiting instructions from the controller 118 to re-initialize 306 and retrieving state information 314 (FIG. 3), processing awaits reception of the encrypted information 712 and, when the encrypted information is received 712, the module controller 144 de-encrypts the state information 714 and re-initializes the UIM 142 therefrom 316. After re-initialization, the module controller could send a re-initialization confirmation to the controller 118.

While at least one exemplary embodiment has been presented in the foregoing detailed description of the invention, it should be appreciated that a vast number of variations exist. For example, when the UIM 142 receives the notice to power down 304, it may be in a state where it cannot tolerate being powered-off. In this case, the module may indicate this to the phone. The indication can be sending a message or setting a control line. Alternately, the module can provide an indication to the phone whenever it enters a state where it can (or cannot) be powered-off. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for power conservation in a hardware module comprising a non-volatile memory and coupleable to a portable electronic device, the hardware module having unique identification information associated therewith and stored in therein, the method comprising the steps of:

providing the unique identification information to the portable electronic device for storage therein;

receiving a power-down notice from the portable electronic device;

storing state information in the non-volatile memory in response to receiving the power-down notice from the portable electronic device, the state information corresponding to all current state information of the hardware module when the power-down notice is received from the portable electronic device;
generating a codeword for authenticating the hardware module;
providing the codeword to the portable electronic device for storage therein; and
powering off.

2. The method of claim 1 wherein the step of storing the state information comprises the steps of:
encrypting the state information to derive encrypted state information; and
providing the encrypted state information to the portable electronic device for storage therein.

3. The method of claim 1 further comprising the steps of:
powering on;
providing the unique identification information to the portable electronic device; and
re-initializing the hardware module utilizing the stored state information in response to a signal from the portable electronic device indicating that the portable electronic device has determined that the unique identification information stored therein is equivalent to the unique identification information provided thereto.

4. The method of claim 3
wherein the step of re-initializing the hardware module comprises the steps of:
receiving the stored codeword from the portable electronic device in response to the portable electronic device determining that the identification information stored therein is equivalent to the unique identification information provided thereto;
determining whether the received stored codeword is equivalent to the generated codeword; and
re-initializing the hardware module in response to the received stored codeword being equivalent to the generated codeword.

5. The method of claim 4 further comprising the step of:
providing an error message to the portable electronic device in response to the received stored codeword not being equivalent to the codeword.

6. The method of claim 3 wherein the step of storing the state information comprises the steps of:
encrypting the state information to derive encrypted state information; and
providing the encrypted state information to the portable electronic device for storage therein, and
wherein the step of re-initializing the hardware module comprises the steps of:
receiving the encrypted state information from the portable electronic device when the portable electronic device determines that the identification information stored therein is equivalent to the unique identification information provided thereto;
decrypting the encrypted state information to recover the state information; and
re-initializing the hardware module utilizing the recovered state information.

7. A method for power conservation in a portable electronic device coupleable to a hardware module, the hardware module having unique identification information associated therewith, the method comprising the steps of:
receiving the unique identification information from the hardware module;
storing the unique identification information;
sending a power-down notice to the hardware module;
receiving a codeword for authenticating the hardware module from the hardware module, the codeword being different from the unique identification information;
storing the codeword;
receiving state information from the hardware module;
storing the state information; and
powering off the hardware module.

8. The method of claim 7 further comprising the steps of:
powering on the hardware module;
receiving the unique identification information from the hardware module;
retrieving the stored unique identification information;
determining whether the received unique identification information is equivalent to the retrieved unique identification information; and
providing the stored codeword to the hardware module to instruct the hardware module to re-initialize in response to determining that the received unique identification information is equivalent to the retrieved unique identification information.

9. The method of claim 8 further comprising the step of:
receiving an error message from the hardware module in response to the stored codeword provided thereto not being equivalent to the codeword stored therein.

10. A method for power conservation in a portable electronic device coupleable to a hardware module, the hardware module having unique identification information associated therewith, the method comprising the steps of:
receiving the unique identification information from the hardware module;
storing the unique identification information;
sending a power-down notice to the hardware module;
receiving encrypted state information from the hardware module;
storing the encrypted state information;
generating a codeword for authenticating the hardware module;
providing the codeword to the portable electronic device for storage therein; and
powering off the hardware module.

11. The method of claim 10 further comprising the steps of:
powering on the hardware module;
receiving the unique identification information from the hardware module;
retrieving the stored unique identification information;
determining whether the received unique identification information is equivalent to the retrieved unique identification information; and
providing the encrypted state information to the hardware module to instruct the hardware module to re-initialize in response to determining that the received unique identification information is equivalent to the retrieved unique identification information.

12. A portable electronic device comprising:
a power source;
power control circuitry coupled to the power source for controlling the supply of power therefrom;
a controller coupled to the power control circuitry for providing power conservation signals thereto for the control of the operation thereof;
a memory coupled to the controller for storing information therein;
a hardware module comprising a module controller and a nonvolatile memory coupled to the module controller, for storing encrypted state information; and
a module connector for physically coupling the hardware module to the portable electronic device and for electrically coupling the power control circuitry and the controller to the module controller, wherein the controller, after receiving first unique identification information from the module controller for storing in the memory, sends a module power-down notice signal to the module controller, receives the encrypted state information from the module controller, stores the encrypted state information in the memory, and, thereafter, sends a first power conservation signal to the power control circuitry for powering-down the hardware module, and wherein the module controller generates a codeword for authenticating the hardware module and provides the codeword to the controller for storage in the memory.

13. The portable electronic device of claim 12 wherein the controller, after sending the first power conservation signal, sends a second power conservation signal to the power control circuitry for powering-on the hardware module, and thereafter receives second unique identification information from the hardware controller, retrieves the first unique identification information from the memory, and, if the first unique identification information is equivalent to the second unique identification information, sends a re-initialize signal comprising the encrypted state information to the hardware controller, and wherein the hardware controller decrypts the encrypted state information and re-initializes the hardware module with the state information derived thereby.

14. A portable electronic device comprising:
a power source;
power control circuitry coupled to the power source for controlling the supply of power therefrom;
a controller coupled to the power control circuitry for providing power conservation signals thereto for control of the operation thereof;
a memory coupled to the controller for storing information therein;
a hardware module comprising a module controller and a nonvolatile memory coupled to the module controller; and
a module connector for physically coupling the hardware module to the portable electronic device and for electrically coupling the power control circuitry and the controller to the module controller, wherein the module controller stores all state information corresponding to a current state of the hardware module in the non-volatile memory when receiving the module power-down notice signal, and wherein the controller, after receiving first unique identification information from the module controller for storage in the memory, sends a module power-down notice signal to the module controller and, thereafter, sends a first power conservation signal to the power control circuitry for powering-down the hardware module, the controller, after sending the first power conservation signal, sending a second power conservation signal to the power control circuitry for powering-on the hardware module, and thereafter receiving second unique identification information from the module controller, retrieving the first unique identification information from the memory, and, if the first unique identification information is equivalent to the second unique identification information, sending a re-initialize signal to the module controller, and wherein the module controller re-initializes the hardware module with the state information stored in the non-volatile memory in response to receiving the re-initialize signal.

15. The portable electronic device of claim 14 wherein the controller, after sending the module power-down notice signal and before sending the first power conservation signal, receives a codeword from the module controller and stores the codeword in the memory, and wherein the re-initialize signal comprises the codeword.

* * * * *